UNITED STATES PATENT OFFICE.

CARL BRIMMER, OF MUNICH, GERMANY.

PROCESS OF REGENERATING OLD GUM OR GUM WASTES.

SPECIFICATION forming part of Letters Patent No. 664,529, dated December 25, 1900.

Application filed October 29, 1900. Serial No. 34,831. (No specimens.)

*To all whom it may concern:*

Be it known that I, CARL BRIMMER, chemist, a citizen of Germany, residing at Munich, Bavaria, Germany, (whose post-office address is Wittelsbacherstrasse 6/3,) have invented certain new and useful Improvements in Processes of Regenerating Old Gum or Gum Wastes; and I do hereby declare the following to be a full, clear, and exact description of the invention, such as will enable others skilled in the art to which it appertains to make and use the same.

My invention relates to an improved process for regenerating old gums and gum wastes, and in particular to a process for regenerating vulcanized india-rubber or caoutchouc.

The object of my invention is to obtain from old gums and gum wastes a product which will be free from the odor of chemicals and which at the same time will have substantially the elasticity of the original gum. Such a product consequently will be useful for all the purposes to which the raw gum can be applied.

My invention, broadly considered, consists in treating the old gum or gum wastes with ricinus-oil, then precipitating the gum, and finally washing the gum and working it to restore it to its original condition.

The preferred manner of carrying out my invention will now be described as applied to the regeneration of old vulcanized caoutchouc. The said material preferably is first comminuted, as by cutting or grinding, and to this comminuted material is then added about an equal weight of ricinus-oil, the mixture being heated to a temperature of about 180° to 210° centigrade, and in no case higher than the latter temperature, until the rubber is dissolved. The solution is next cooled and then poured into twice its volume of ninety-per-cent. alcohol, the latter being constantly stirred during the introduction of the rubber-and-oil solution. The rubber then precipitates as a viscous tenacious mass, while the ricinus-oil remains in solution with the alcohol. The precipitated viscous mass is separated from the solution and then repeatedly washed in a relatively small quantity of fresh alcohol until a sample of the rubber dropped upon clean paper fails to cause a grease spot after the evaporation of the alcohol. As the rubber mass will retain a considerable percentage of the alcohol, which will make the rubber sticky, it is necessary to treat the said mass at this stage of the process by washing it with a weak solution of caustic soda in warm water and then by washing it with clean water alone. The rubber is then subjected to kneading or compression, preferably by rolling it into plates, whereby it is soon freed from any remaining moisture. The regenerated rubber thus produced has all the desirable properties which it had in the original raw condition.

Having thus fully described my invention, what I claim as new, and desire to secure by Letters Patent, is—

1. The process of regenerating gum which consists in first dissolving the gum in ricinus-oil with the aid of heat, and then precipitating the gum with alcohol.

2. The process of regenerating gum which consists in first mixing the gum with ricinus-oil and then heating the mixture to a temperature of 180° to 210°, centigrade, until the gum is dissolved, next cooling the mixture, and then adding alcohol to said mixture, whereby the gum is precipitated.

3. The process of regenerating gum which consists in first mixing the gum with ricinus-oil, then heating the mixture to a temperature of 180° to 210°, centigrade, until the gum is dissolved, next cooling the mixture, then adding alcohol to said mixture whereby the gum is precipitated, separating the precipitated gum from the liquid, washing the gum thus separated, and finally applying pressure to the gum to compact it.

4. The process of regenerating gum, which consists in first mixing the gum, in a comminuted condition, with an equal weight of ricinus-oil, then heating the mixture to a temperature of 180° to 210°, centigrade, until the gum is dissolved, next cooling the mixture, then pouring it into double its volume of alcohol while stirring the latter, whereby the gum is precipitated, next removing the precipitate and washing it repeatedly with alcohol, then washing with a weak solution of caustic soda in warm water, then washing in clear water, and finally compressing the gum.

In testimony whereof I affix my signature in presence of two witnesses.

CARL BRIMMER.

Witnesses:
ELLWOOD WILSON,
WALLY SEITZ.